United States Patent [19]

Doty et al.

[11] Patent Number: 5,751,613
[45] Date of Patent: May 12, 1998

[54] PERSISTENT HEAP FOR DYNAMIC PICTURE OBJECTS

[76] Inventors: Douglas E. Doty, 5905 E. Cielo Run Ss, Cave Creek, Ariz. 85331; David G. Johnsen, 801 W. Toropah Dr., Phoenix, Ariz. 85027; Donald W. Moore, 2901 E. Friess Dr., Phoenix, Ariz. 85032

[21] Appl. No.: 697,919

[22] Filed: Sep. 3, 1996

[51] Int. Cl.⁶ .................................................. G06F 12/08
[52] U.S. Cl. .......................... 364/578; 395/335; 395/413; 395/566; 395/965
[58] Field of Search .................................. 395/375, 200, 395/600, 161, 182.13, 670, 683, 410, 413, 561, 566, 326; 364/578

[56] References Cited

U.S. PATENT DOCUMENTS

| | | | |
|---|---|---|---|
| 5,222,221 | 6/1993 | Houri et al. | 395/375 |
| 5,265,206 | 11/1993 | Shackelford et al. | 395/200 |
| 5,430,850 | 7/1995 | Papadopoulos et al. | 395/375 |
| 5,485,607 | 1/1996 | Lomet et al. | 395/600 |
| 5,495,567 | 2/1996 | Iizawa et al. | 395/161 |
| 5,564,011 | 10/1996 | Yammine et al. | 395/182.13 |
| 5,590,327 | 12/1996 | Biliris et al. | 395/670 |
| 5,652,888 | 7/1997 | Burgess | 395/683 |

OTHER PUBLICATIONS

"Persistent Heaps", by M. Ancona, IEEE Computers and Communications, 1990 Int'l. Phoenix Conference, May 1990, pp. 324–331.

"Persistence + Undoabilty = Transactions", by Nettles et al., IEEE System Sciences, 1992 Annual Hawaii Int'l. Conference, Jan. 1992, pp. 832–843.

"A Distributed Lisp Programming System: Implementation and Usage", by Pearson et al., IEEE Distributed Computing Systems, 1992 Int'l. Conference, pp. 690–697.

*Primary Examiner*—Kevin J. Teska
*Assistant Examiner*—Russell W. Frejd
*Attorney, Agent, or Firm*—Paul D. Greeley

[57] ABSTRACT

There is provided a process control system having a display program that permits an program designer to create and edit dynamic picture objects in a persistent heap and save the heap to a storage medium. The display program rapidly reads the dynamic picture objects from the storage medium and invokes the objects for viewing on the system's interactive display. When the persistent heap is subsequently read from the storage medium by an operator, the dynamic picture objects stored in the heap do not need to be instantiated and, thus, invocation of the objects is accelerated and optimized. Accordingly, the persistent heap greatly improves the speed in which picture objects can be read from the storage medium, processed by the display program and called-up to the interactive display.

31 Claims, 6 Drawing Sheets

PERSISTENT HEAP FOR DYNAMIC PICTURE OBJECTS

The present invention relates generally to process control systems having interactive displays for controlling the operations of plant facilities, refineries and the like. More particularly, the present invention relates to a process control system having a display program that permits a process designer, such as an engineer, to create and edit dynamic picture objects for interactive display and permits an operator to interact with the display to control plant operations. In particular, the present invention provides an improved method for quickly displaying the dynamic picture objects on the interactive display when used by the process designer to create or edit the dynamic picture objects or the operator of a control plant to display the dynamic picture objects.

BACKGROUND OF THE INVENTION

Operators of plants and refineries must have up-to-date information in order to monitor and maintain day-to-day operations of such facilities. An operator typically interacts with a particular computer connected to a computer network that is wired to various sensors positioned throughout the facility. The computer network receives operational and environmental information from the sensors and provides this information on the interactive display of the operator's computer. Thus, the computer network operates as a real-time database to provide current process values to the operator via the interactive display.

The process control system also includes a display program that provides the program designer or operator with a visual layout or schematic of the facility. The display program is a drawing program that provides a multitude of picture objects each representing a structure, machine or area in the facility. To store the picture objects, the display program saves them to files by serialization, i.e., one word at a time, of many different objects into streams. Similarly, to retrieve the picture objects, the display program reads files by serialization and places the picture objects at fixed locations predetermined by the display program. This serialization process for storing and retrieving files is commonly used for certain operating systems, such as Windows NT® by Microsoft Corporation, that have specific operating subsystem routines that are readily available for such purposes.

It is highly desirable that display programs be capable of providing the picture objects on an interactive display very quickly. However, the serialization process for storing and retrieving files used by existing display programs is laggard and slows down the computer's ability to provide stored objects to the operator in a timely fashion. In general, storage and retrieval of serialized files is performed at a relatively slow rate (in a matter of seconds) and, thus, hinders the ability of the program designer and/or operator to effectively use their computer.

The present invention provides for the use of a persistent heap, instead of serializing objects into a stream, to greatly improve the speed in which dynamic picture objects may be read from the storage medium and processed. The persistent heap also provides for improved speed in providing the dynamic picture objects on the interactive display. In particular, the present invention involves a system having a display program that permits a program engineer or designer to create and edit dynamic picture objects in a persistent heap and save the heap as a file to a storage medium, such as a disk drive. Accordingly, when the file of the persistent heap is subsequently read from the storage medium by an operator, the dynamic picture objects in the heap do not need to be instantiated and, thus, invocation of the objects is accelerated and optimized.

SUMMARY OF THE INVENTION

A system and process for displaying objects stored in a persistent heap. In particular, the system comprises a means for forming a persistent heap in the virtual memory portion of a processor, a means for retrieving a heap file from a storage medium of the processor to the persistent heap, and a means for displaying at least one object on a display of the processor. The heap file includes at least one picture object and is retrieved from the storage medium to the persistent heap as a single read statement.

The persistent heap includes a first linked list of free blocks and a second linked list of used blocks, and is formed at a preferred heap address of the memory portion of the processor (e.g., a microprocessor). The persistent heap may also be formed at an alternate heap address of the memory portion of the processor if the persistent heap cannot be formed at the preferred heap address. In such event, the forming means includes means for locating a contiguous block of the memory portion and means for allocating the persistent heap at the contiguous block.

The processor also comprises a means for activating a display program such that the means for forming the persistent heap is responsive to the activation of the display program. The persistent heap persists throughout the invocation of the display program and is effective to store at least one object used by the display program.

The processor further includes a means for storing all objects of the persistent heap from the persistent heap to the storage medium, means for creating a new object in the persistent heap, means for editing an existing object in the persistent heap, and means for deleting an existing object from the persistent heap.

Furthermore, the processor includes a means for archiving the persistent heap into a separate stream to form an archive file, a means for detecting an invalid object in the heap file, and a means, responsive to the detection means, for forming the heap file in the persistent heap by de-archiving the archive file.

The present invention is also directed to a process for displaying objects held in a persistent heap and stored in a heap file which comprises: forming the persistent heap; retrieving the heap file from a storage medium; loading the heap file to the persistent heap, the heap file including at least one object; and displaying the object.

Still further, the present invention include a storage media for controlling a processor such that the processor is capable of displaying objects held in a persistent heap and stored in a heap file, the storage media comprising: a means for forming the persistent heap in a memory portion of the processor; a means for retrieving the heap file from a storage medium of the processor; a means for loading the heap file to the persistent heap, the heap file including at least one object; and a means for displaying the object on a display of the processor.

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

A system having a display program that permits a program designer to create, edit and save dynamic picture objects in a persistent heap and save the heap to a storage medium, such as a disk drive. The persistent heap provides the ability to create objects, non-object memory allocations, strings and object lists that persist across the invocations of a particular program. Thus, the display program rapidly reads the dynamic picture objects from the storage medium and invokes the objects for viewing on an interactive display. Accordingly, the persistent heap greatly improves the speed in which picture objects can be read from the storage medium, processed by the display program and called-up to the interactive display.

Figure 1:
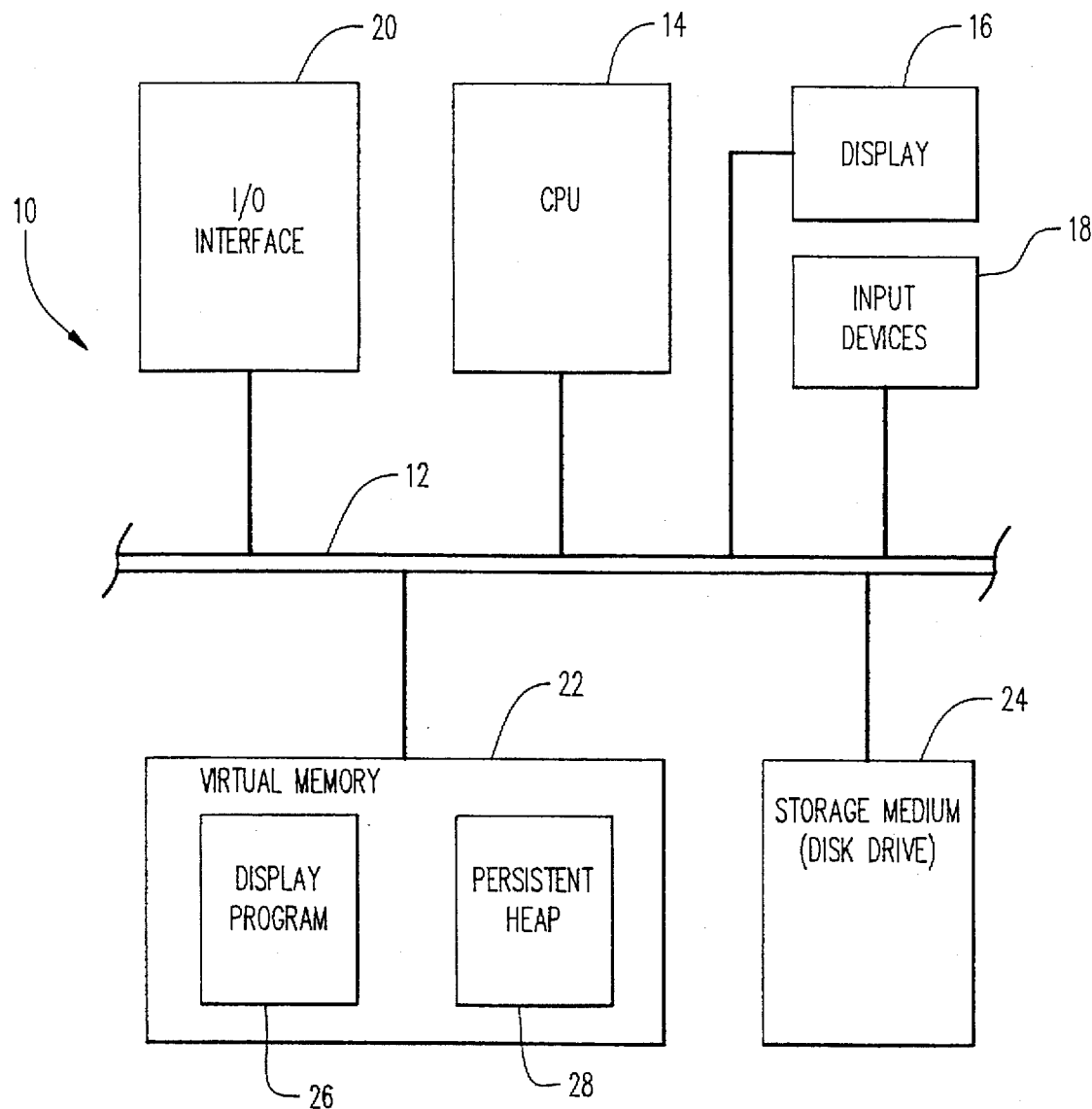
FIG. 1 is a block diagram of the preferred system in accordance with the present invention.

Referring to the drawings and, in particular, to FIG. 1, there is provided a system of the preferred embodiment which is generally represented by reference numeral 10. System 10 comprises various components coupled to an address/data bus 12, namely a central processing unit ("CPU") 14, an interactive display 16, one or more input devices 18, and an input/output ("I/O") interface 20. CPU 14 may be any type of processor that is capable of handling memory addressing functions, particularly heap addressing functions, as well as basic computer functions. To interact with system 10, a program designer or operator would view a layout or schematic of a facility, such as a plant facility, refinery or the like, on display 16. The program designer or operator would also provide information and responses to system 10 using input devices 18, such as a computer keyboard and/or mouse. Also, I/O interface 20 provides a connection to other systems and to various sensors positioned throughout the facility so that current process values are shown, in real-time, on display 16.

The preferred system 10 further includes virtual memory 22 to provide CPU 14 with workspace to execute programs and store data temporarily and a storage medium 24 for permanent storage of data and files. The operating system for system 10, for example Windows NT® by Microsoft Corporation, is stored in virtual memory 22. To use display program 26, the program designer or operator would load display program 26 from storage medium 24 to virtual memory 22 and execute display program 26 in virtual memory 22. In turn, display program 26 would load persistent heap 28 from storage medium 24 to virtual memory 22 or, if persistent heap 28 does not exist in storage medium 24, create persistent heap 28 in virtual memory 22.

Persistent heap 28 is a region of reserved address space that is used for managing numerous small blocks of data, such as linked lists. Persistent heap 28 provides the ability to create objects, non-object memory allocations, strings and object lists that persist across the invocation of the program. Examples of such information include, but are not limited to, primitive objects, embedded picture objects, the script symbol table and script objects. For the preferred embodiment, the above information is stored in heap 28 as a first linked list of free blocks and a second linked list of used blocks.

Persistent heap 28 allocates a large block of virtual address space, but commits only enough space that required by the picture objects. The initial allocation is set to be larger than the space expected for the largest picture object that could be created. When objects are created, they either reuse a free block of heap 28 or they expand the committed memory space of heap 28. For the preferred embodiment, once a block of memory is allocated at a given size, it will always remain at that size.

One feature of the present invention is to load persistent heap 28 from a document or heap file in storage medium 24 to virtual memory 22 as a single read statement. When an operator uses display program 10 in runtime, heap 28 is always loaded at the same address or location in memory. In particular, heap 28 is serialized at a preferred load address, so that it is always at that preferred address at runtime. Address correction is not required, and heap 28 is ready to be used as soon as it is loaded. Thus, heap 28 is written to the file in storage medium 24 with a single write statement and read from the file with a single read statement.

In contrast, when a program designer uses display program 10 to create or edit picture objects, heap 28 may be located at a different address or location. For example, when creating or editing picture objects, the program designer may be working with multiple document files. In such event, only the first document file can position its heap at the preferred address, and the heaps of the other document files must be positioned be at higher virtual addresses. When storing or loading the heap of such other document files, it is necessary to adjust the pointer values in the objects to correspond with the load address. In particular, when storing heap 28 to storage medium 24, all pointers are adjusted to have values that they would have if heap 28 were located at the preferred address. Also, when loading heap 28, the pointers are adjusted to the actual location of heap 28. Therefore, all pointers in their heaps are adjusted to values they would have as if the heap were at the preferred address, save to an archive, and then restored to their correct addresses.

Another feature of the present invention is to provide a backup means for reading persistent heap 28. Persistent heap 28 is an image of the heap and, thus, heap 28 cannot be read if the size or arrangement of an object changes. In particular, serializing and deserializing must take into account that heap 28 may not be at the same address when it is deserialized, and that the code may have been relocated due to a minor version change. Also, if the content of a picture object has changed, the difference may be too great for heap 28 to automatically compensate. Accordingly, the persistent heap is archived into a separate stream so that the heap recreates itself from the archive when it detects an invalid object.

Figure 2:
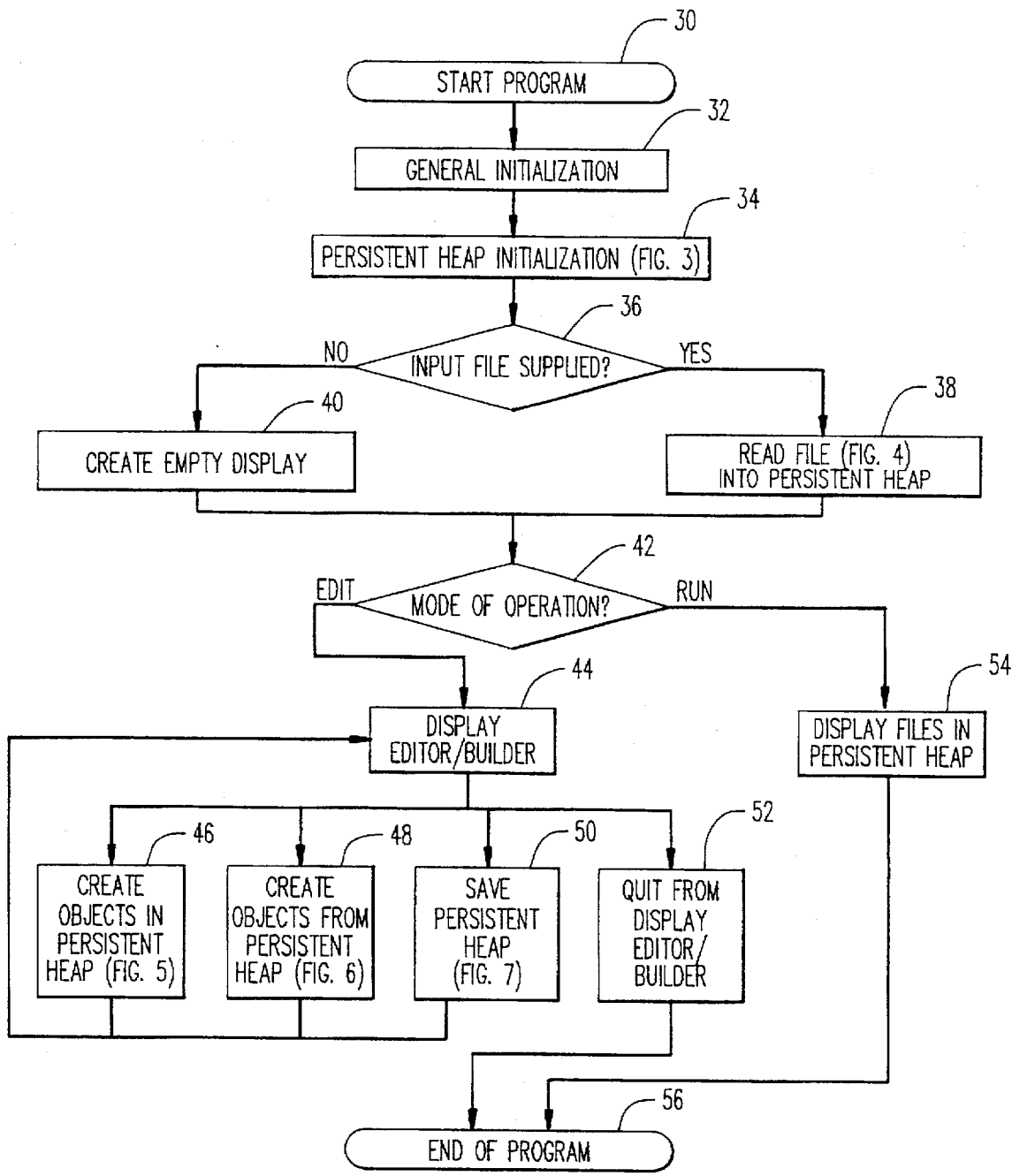
FIG. 2 is a flow diagram of the operation of the preferred system of FIG. 1.

Referring to FIG. 2, there is provided a flow diagram of the operation of the preferred system shown in FIG. 1. When the program designer or operator activates display program 26, display program 26 is initiated as represented by step 30, and a general initialization of display program 26 is executed as represented by step 32. Following the general initialization, display program 26 performs a persistent heap initialization 34 for allocating a portion of virtual memory 22 to create persistent heap 28 as shown in step 34. Next, a heap file located storage medium 24 is read into persistent heap 28 of virtual memory 22 as shown in step 38 or, in the alternative, persistent heap 28 is left empty if the heap file does not exist in storage medium 24 as shown in step 40.

The persistent heap 28 is now ready for use and a mode of operation is selected for the display program 26, as represented by step 42. Display program 26 is used by a program designer to create and edit dynamic picture objects for viewing on display 16 or by an operator to view the dynamic picture objects on display 16. To create and edit the picture objects, a main screen of a display editor/builder subprogram of display program 26 is activated, as shown in step 44. This display editor/builder subprogram may be used to create and edit objects in persistent heap 28 as shown in step 46, delete objects from persistent heap 28 as shown in step 48, or save the contents of persistent heap 28 to storage medium 24 as shown in step 50. After creating an object, deleting an object or saving persistent heap 28, display program 26 returns to the main screen of the display editor/builder subprogram at step 44. The operation of the display editor/builder subprogram may be terminated as shown in step 52. In addition, to view the dynamic picture objects on display 16, the operator simply activates a viewing subprogram as represented by step 54. Either the display editor/builder subprogram or the viewing subprogram may be terminated to end operation of display program 26 as shown in step 56.

It is important to note that the contents of persistent heap 28 is saved to storage medium 24 in a form that, subsequently, can be quickly read back into persistent heap 28. Thus, in reference to step 50, the contents of persistent heap is saved to storage medium 24 so that the heap file is loaded as a single read statement and is always loaded at the same address or location in virtual memory 22. Therefore, when the operator activates the viewing subprogram, the dynamic picture objects stored in heap 28 do not need to be instantiated and, thus, invocation of the objects is accelerated and maximized.

Figure 3:
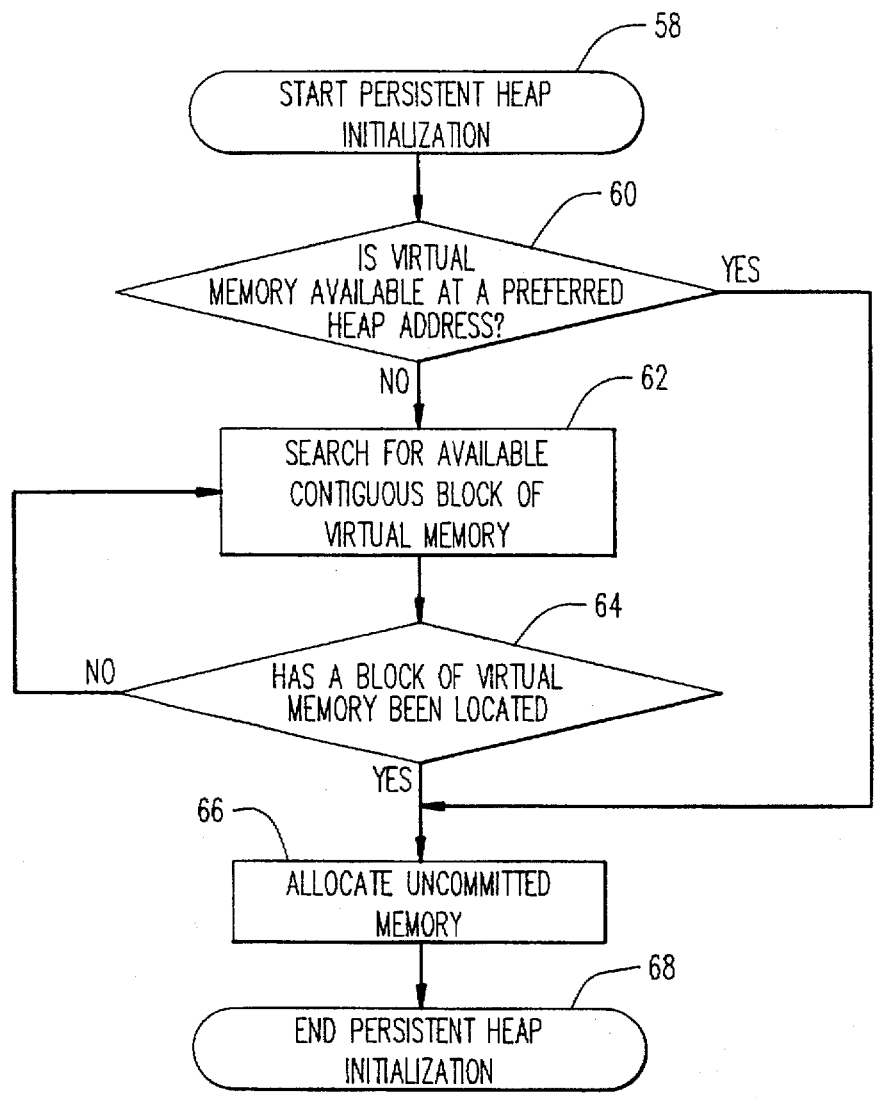
FIG. 3 is a flow diagram of the Persistent Heap Initialization subroutine of FIG. 2.

Referring to FIG. 3, there is provided the particular steps followed by display program 26 to perform the persistent heap initialization of step 34 shown in FIG. 2. After the persistent heap initialization is started at step 58, display program 26 determines whether the preferred heap address of virtual memory 22 is available as shown in step 60. If not, display program 26 searches for available contiguous blocks of virtual memory 22 until an acceptable block of virtual memory 22 has been located, as represented by steps 62 and 64. Thereafter, the uncommitted memory is allocated as shown in step 66, and initialization of persistent heap ends as shown in step 68.

Figure 4:
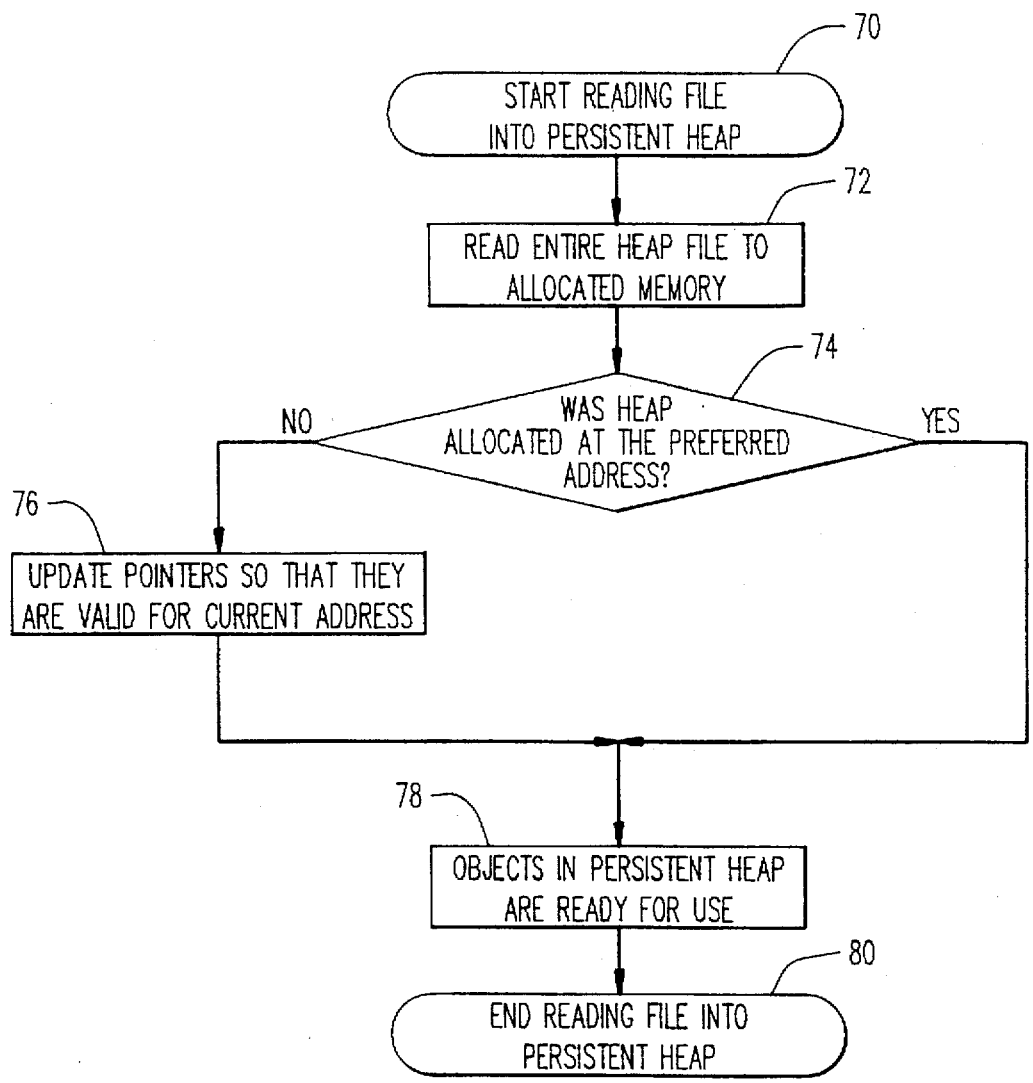
FIG. 4 is a flow diagram of the Read File into Persistent Heap subroutine of FIG. 2.

Referring to FIG. 4, there is provided the steps followed by display program 26 to read the heap file into persistent heap 28 of step 38 shown in FIG. 2. After initiating this subroutine, as shown in step 70, the entire heap file is read to the allocated memory, namely persistent heap 28 of virtual memory 22, as shown in step 72. Display program 26 then determines whether persistent heap 28 had been allocated at the preferred heap address at step 74. If so, the dynamic picture objects in persistent heap 28 are ready for use as shown in step 72, and the subroutine ends as shown in step 80. On the other hand, if persistent heap 28 had not been allocated at the preferred heap address, then all pointers must be updated so that they are valid for the current address of persistent heap 28, as shown in step 76, before the objects are ready for use.

Figure 5:
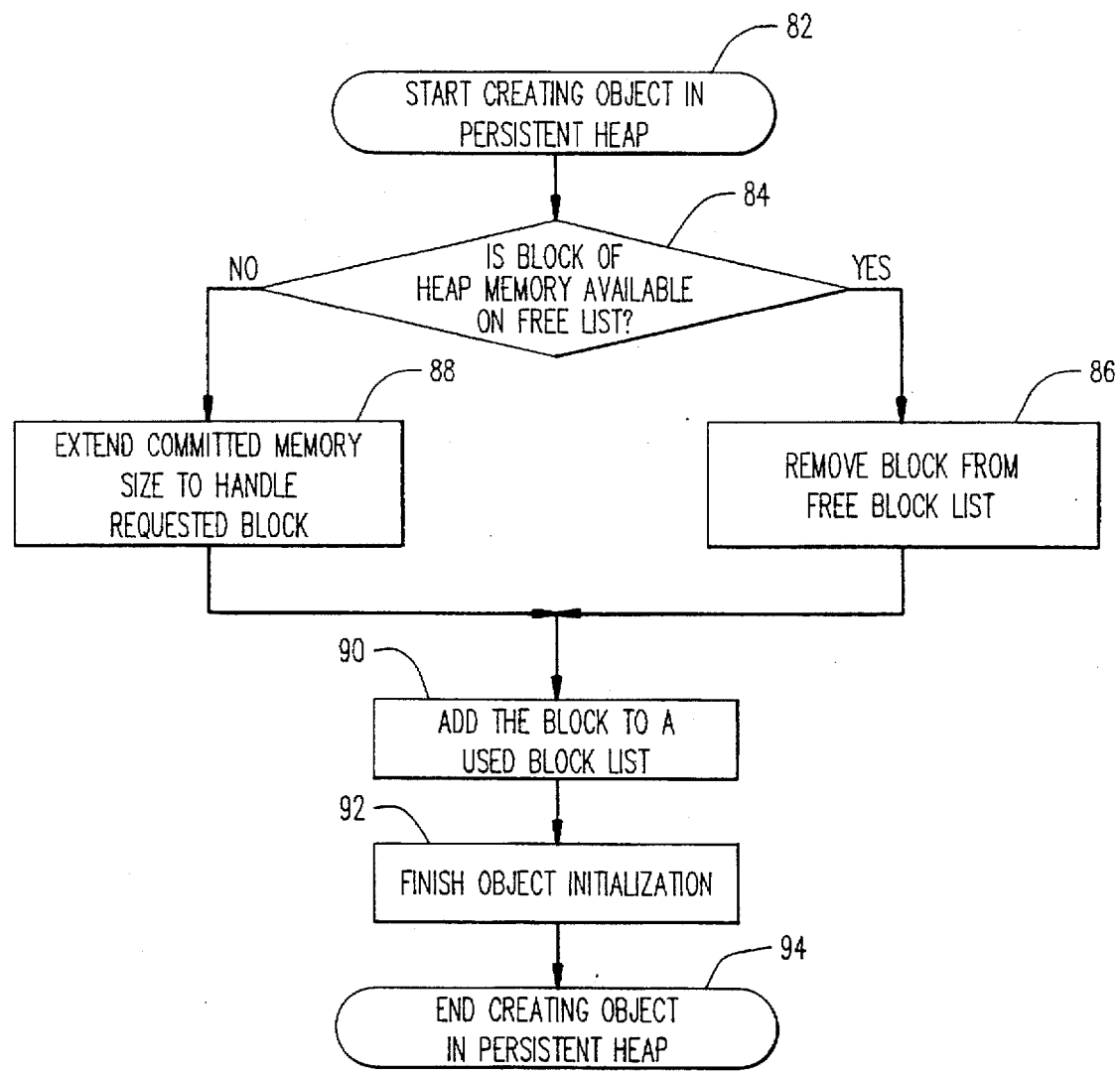
FIG. 5 is a flow diagram of the Create Object in Persistent Heap subroutine of FIG. 2.

Referring to FIG. 5, there is provided the steps followed by display program 26 to create an object in persistent heap 28 of step 46 shown in FIG. 2. As stated above, persistent heap 28 includes a first linked list of free blocks and a second linked list of used blocks. After initiating this subroutine at step 82, dynamic picture objects are created in persistent heap 28 by first determining whether a block of heap memory is available on the first linked list of free blocks as shown in step 84. If a block is available, then the block is simply removed from the first linked list as shown in step 86. On the other hand, if a block is not available, the committed memory size of persistent heap 28 is extended to handle the requested block as shown in step 88. Then, the block is added to the second linked list of used blocks as shown in step 90. Finally, the object initialization is finished as shown in step 92, and the subroutine is ended as shown in step 94 and display program 26 routines to the main screen of the display editor/builder subprogram.

Figure 6:
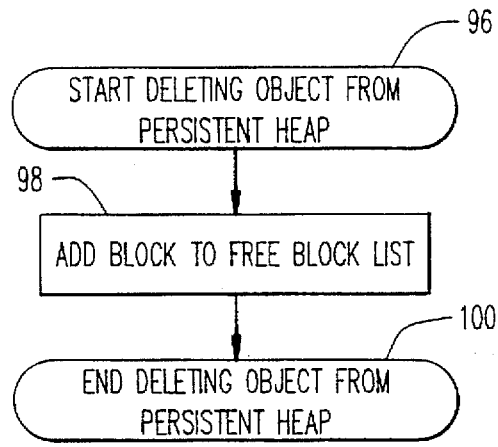
FIG. 6 is a flow diagram of the Delete Object from Persistent Heap subroutine of FIG. 2.

Referring to FIG. 6, there is provided the steps followed by display program 26 to delete an object from persistent heap 28 of step 48 shown in FIG. 2. Upon initiation of the subroutine as shown in step 96, a block is added to the first linked list of free blocks as shown in step 98. Then, in step 100, the subroutine ends and display program 26 routines to the main screen of the display editor/builder subprogram.

Figure 7:
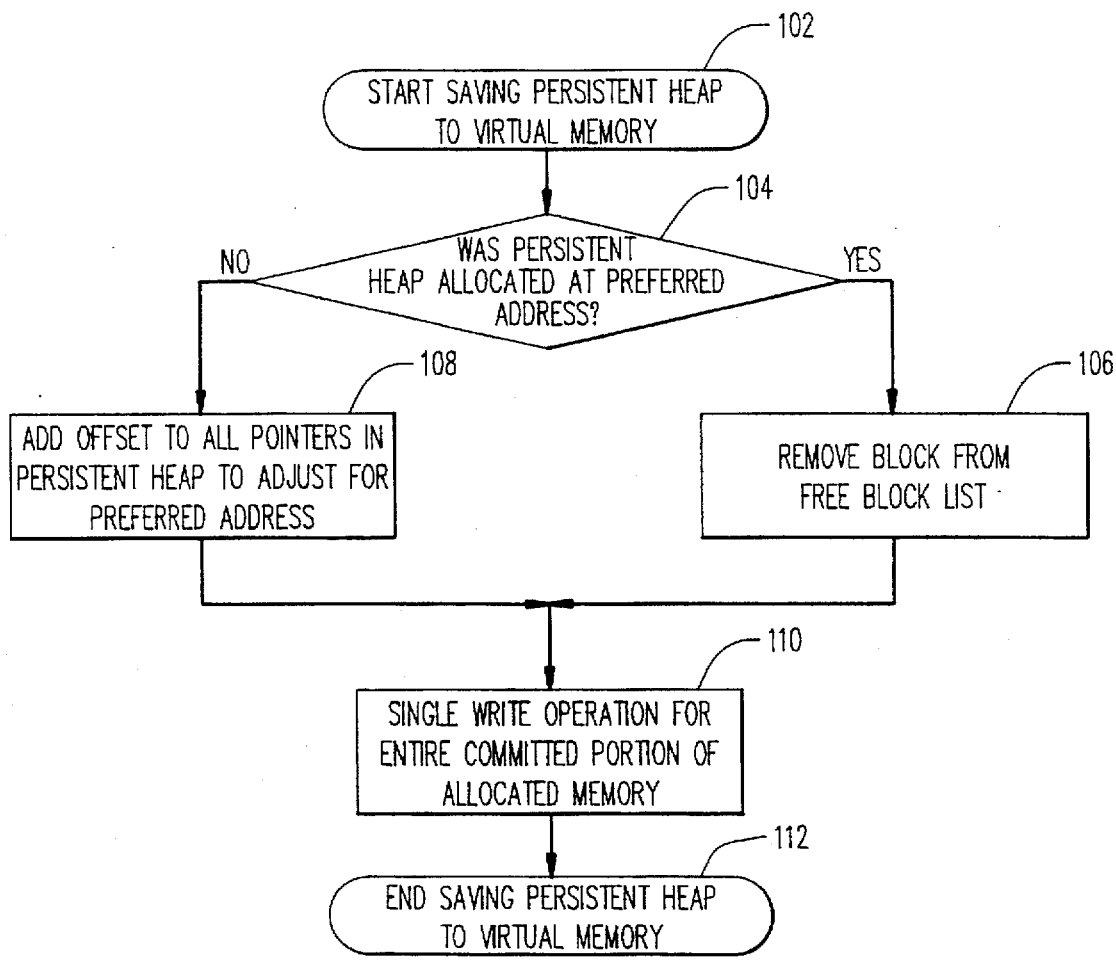
FIG. 7 is a flow diagram of the Save Persistent Heap subroutine of FIG. 2.

Referring to FIG. 7, there is provided the steps followed by display program 26 to save persistent heap 28 to storage medium 24 of step 50 shown in FIG. 2. The subroutine for saving persistent heap 28 is initiated as shown in step 102. Display program 26 then determines whether persistent heap 28 had been allocated at the preferred heap address. If so, a block is removed from the first linked list of free blocks as shown in step 106. However, if persistent heap 26 had not been allocated at the preferred heap address, an offset is added to all pointers in persistent heap 26 to adjust for variance between the current address and the preferred heap address as shown in step 108. Thereafter, a single write operation is performed for the entire committed portion of allocated memory to storage medium 24 as shown in step 110. Later, when the heap file is loaded into virtual memory 22 by an operator, persistent heap 28 will be loaded as a single read statement. Finally, in step 112, the subroutine ends and display program 26 routines to the main screen of the display editor/builder subprogram.

The present invention having been thus described with particular reference to the preferred forms thereof, it will be obvious that various changes and modifications may be made therein without departing from the spirit and scope of the invention as defined in the appended claims.

What is claimed is:

1. A system for displaying objects held in a persistent heap and stored in a heap file which comprises:
    a means for forming said persistent heap in a virtual memory portion of said system;
    a means for retrieving said heap file from a storage medium of said system;
    a means for loading said heap file to said persistent heap, said heap file including at least one object; and
    a means for displaying said object on a display of said system.

2. The system of claim 1, wherein said persistent heap is formed at a preferred heap address of said virtual memory portion of said system.

3. The system of claim 2, wherein said persistent heap is formed at an alternate heap address of said virtual memory portion of said system if said persistent heap cannot be formed at said preferred heap address; and said forming means includes means for locating a contiguous block of said virtual memory portion and means for allocating said persistent heap at said contiguous block.

4. The system of claim 1, wherein said heap file is retrieved from said storage medium to said persistent heap as a single read statement.

5. The system of claim 1, further comprising means for storing all said objects of said persistent heap to said storage medium.

6. The system of claim 1, further comprising means for creating a new object in said persistent heap, means for editing an existing object in said persistent heap, and means for deleting an existing object from said persistent heap.

7. The system of claim 1, wherein said persistent heap includes a first linked list of free blocks and a second linked list of used blocks.

8. The system of claim 1, further comprising means for archiving said persistent heap into a separate stream to form an archive file.

9. The system of claim 8, further comprising:
a means for detecting an invalid object in said heap file; and
a means, responsive to said detection means, for forming said heap file in said persistent heap by de-archiving said archive file.

10. A system for displaying objects held in a persistent heap and stored in a heap file which comprises:
a means for activating a display program;
a means, responsive to said activation of said display program, for forming a persistent heap in a virtual memory portion of said system, wherein said persistent heap persists throughout the invocation of said display program, said persistent heap being effective to store at least one object used by said display program;
means for displaying said at least one object on a display of the system.

11. The system of claim 10, wherein said persistent heap is formed at a preferred heap address of said virtual memory portion of the system.

12. The system of claim 11, wherein said persistent heap is formed at an alternate heap address of said virtual memory portion of said system if said persistent heap cannot be formed at said preferred heap address; and said forming means includes means for locating a contiguous block of said virtual memory portion and means for allocating said persistent heap at said contiguous block.

13. The system of claim 10, further comprising means for creating a new object in said persistent heap, means for editing an existing object in said persistent heap, and means for deleting an existing object from said persistent heap.

14. The system of claim 10, wherein said persistent heap includes a first linked list of free blocks and a second linked list of used blocks.

15. The system of claim 10, further comprising means for archiving said persistent heap into a separate stream to form an archive file.

16. The system of claim 15, further comprising:
means for detecting an invalid object in said heap file; and
means, responsive to said detection means, for forming said heap file in said persistent heap by de-archiving said archive file.

17. A process for displaying objects held in a persistent heap and stored in a heap file which comprises:
forming said persistent heap;
retrieving said heap file from a storage medium;
loading said heap file to said persistent heap, said heap file including at least one object; and
displaying said object.

18. The process of claim 17, wherein said heap file is retrieved from said storage medium to said persistent heap as a single read statement.

19. The process of claim 17, further comprising:
storing all said objects of said persistent heap to said storage medium.

20. The process of claim 17, further comprising:
creating a new object in said persistent heap;
editing an existing object in said persistent heap; and
deleting an existing object from said persistent heap.

21. The process of claim 17, further comprising:
archiving said persistent heap into a separate stream to form an archive file.

22. The process of claim 21, further comprising:
detecting an invalid object in said heap file; and
forming said heap file in said persistent heap by de-archiving said archive file.

23. A storage media for controlling a processor such that said processor is capable of displaying objects held in a persistent heap and stored in a heap file, said storage media comprising:
a means for forming said persistent heap in a virtual memory portion of said processor;
a means for retrieving said heap file from a storage medium of said processor;
a means for loading said heap file to said persistent heap, said heap file including at least one object; and
a means for displaying said object on a display of said processor.

24. The storage media of claim 23, wherein said persistent heap is formed at a preferred heap address of said virtual memory portion of said processor.

25. The storage media of claim 24, wherein said persistent heap is formed at an alternate heap address of said virtual memory portion of said processor if said persistent heap cannot be formed at said preferred heap address; and said forming means includes means for locating a contiguous block of said virtual memory portion and means for allocating said persistent heap at said contiguous block.

26. The storage media of claim 23, wherein said heap file is retrieved from said storage medium to said persistent heap as a single read statement.

27. The storage media of claim 23, further comprising means for storing all said objects of said persistent heap to said storage medium.

28. The storage media of claim 23, further comprising means for creating a new object in said persistent heap, means for editing an existing object in said persistent heap, and means for deleting an existing object from said persistent heap.

29. The storage media of claim 23, wherein said persistent heap includes a first linked list of free blocks and a second linked list of used blocks.

30. The storage media of claim 23, further comprising means for archiving said persistent heap into a separate stream to form an archive file.

31. The storage media of claim 30, further comprising:
a means for detecting an invalid object in said heap file; and
a means, responsive to said detection means, for forming said heap file in said persistent heap by de-archiving said archive file.

* * * * *